US006150487A

United States Patent [19]

Zhang et al.

[11] Patent Number: 6,150,487

[45] Date of Patent: Nov. 21, 2000

[54] MULTIFUNCTIONAL ORGANIC ALKALI METAL INITIATOR AND ITS SYNTHESIS, ANIONIC POLYMERIZED STAR POLYMERS AND THEIR PREPARATION

[75] Inventors: Xingying Zhang; Guantai Jin; Suhe Zhao, all of Beijing, China

[73] Assignee: China Petrochemical Corporation, Beijing, China

[21] Appl. No.: 09/051,760

[22] PCT Filed: Oct. 17, 1996

[86] PCT No.: PCT/CN96/00090

§ 371 Date: Jun. 26, 1998

§ 102(e) Date: Jun. 29, 1998

[87] PCT Pub. No.: WO97/14722

PCT Pub. Date: Apr. 24, 1997

[30] Foreign Application Priority Data

Oct. 17, 1995 [CN] China ................................ 95116575

[51] Int. Cl.[7] ......................... C08F 36/04; C08F 297/02; C08F 4/46

[52] U.S. Cl. ......................... 526/335; 526/176; 526/177; 526/178; 526/329.1; 526/329.2; 526/346; 526/347; 526/347.1; 556/52; 556/87; 556/170; 556/178; 556/187; 556/465; 556/478; 568/1; 568/3; 502/153; 502/157

[58] Field of Search .................................... 526/176, 177, 526/178, 335, 329.1, 329.2, 340.2, 346, 347, 347.1; 556/52, 87, 178, 187, 465, 478, 170; 568/1, 3; 502/153, 157

[56] References Cited

U.S. PATENT DOCUMENTS

| | | | |
|---|---|---|---|
| 3,122,527 | 2/1964 | Webb et al. | 526/176 X |
| 4,020,258 | 4/1977 | Farrar | 526/176 X |
| 4,091,198 | 5/1978 | Smith et al. | 526/178 |
| 4,161,494 | 7/1979 | Sigwalt et al. | 260/665 |
| 4,196,153 | 4/1980 | Tung et al. | 260/665 R |
| 4,397,994 | 8/1983 | Takeuchi et al. | 525/332.3 |
| 4,435,312 | 3/1984 | Lecolier et al. | 502/157 |
| 4,519,431 | 5/1985 | Yoshimura et al. | 152/209 R |
| 4,540,744 | 9/1985 | Oshima et al. | 525/332.9 |
| 4,603,722 | 8/1986 | Oshima et al. | 152/209 R |
| 4,742,124 | 5/1988 | Tsutsumi et al. | 525/332.1 |
| 5,527,753 | 6/1996 | Engel et al. | 502/155 |
| 5,587,420 | 12/1996 | Takizawa et al. | 526/176 X |

FOREIGN PATENT DOCUMENTS

| | | |
|---|---|---|
| 0210016 | 1/1987 | European Pat. Off. . |
| 0493839 | 7/1992 | European Pat. Off. . |
| 150469 | 2/1977 | German Dem. Rep. . |
| 158781 | 4/1980 | German Dem. Rep. . |
| 57-205414 | 12/1982 | Japan . |
| 2124228 | 2/1984 | United Kingdom . |
| 2160207 | 12/1985 | United Kingdom . |
| 9112277 | 8/1991 | WIPO . |

OTHER PUBLICATIONS

Hackh's Chem. Dictionary, 4th ed., McGraw–Hill, N.Y., p. 472, 1969.

Lei, Z. et al., "Synthesis and Characterization of Star–Shaped Isoprene–Styrene Block Copolymer", *Shiyou Huagong*, vol. 19, No. 9, 1990 pp. 604–605 (606).

Xingying, Z., et al., "Synthesis of Energy–Saving Solution–Polymerized SBR", *Hecheng Xiangiano Gongye*, vol. 14, No. 6, p. 393 (394).

Rei, Y. et al., "A Method of Controlling the Structure of the Active Core for Preparing Star Polymer", *The Academic Thesis Photoprint Collection of the National Molecular Polymer Report Conference*, 1987, pp. 126–127.

Rei, Y. et al., "Synthesis of Gel–Star Polymer (1) The Research of Preparing Microgel Nuclei", *The Academic Thesis Photoprint Collection of the National Molecular Polymer Report Conference,* 1987, pp. 124–125.

*Primary Examiner*—Fred Teskin

*Attorney, Agent, or Firm*—Ladas & Parry

[57] ABSTRACT

This invention relates to a multifunctional organic alkali metal initiator for the preparation of various kinds of star polymers by anionic polymerization, a process for making the initiator, a process using said initiator for making star polymers and the polymers obtained. The initiator can be represented by the formula: $M_a\ (RMe)_b$, wherein M is selected from Sn, Ti, Al, Si and/or B; R is a hydrocarbyl group containing 8–100 carbon atoms, a=1–3, b=2.5–6.5, Me is an alkali metal which may be selected from Na and Li. The initiator was synthesized by reacting an organic alkali metal with a conjugated diene and/or a mono-olefin monomer, and then adding hetero-atom containing halide. The star polymer obtained has a radial molecular structure consisting of several macromolecular chain arms radiating from the initiator core, and its molecular weight distribution expressed by GPC presents a uniform singlet.

30 Claims, 3 Drawing Sheets

GPC Chart of
NS - 110 ( Nippon Zeon, LTD)

$(\overline{M}_w / \overline{M}_n = 2.17)$

GPC Chart of
NS - 114 ( Nippon Zeon, LTD)

$(\overline{M}_w / \overline{M}_n = 1.74)$

MULTIFUNCTIONAL ORGANIC ALKALI METAL INITIATOR AND ITS SYNTHESIS, ANIONIC POLYMERIZED STAR POLYMERS AND THEIR PREPARATION

FIELD OF THE INVENTION

The present invention relates to a multifunctional organic alkali metal initiator suitable for synthesizing various star polymers and its synthesis, the anionic polymerized star polymers of olefins prepared thereby and their preparing process. More particularly, the present invention relates to the multifunctional organic alkali metal initiator for anionic solution homopolymerization or solution copolymerization of monoolefin and/or diene and its synthesis, and also the polymerization process for polymerizing monoolefin and/or diene initiated by said initiator as well as its polymerization products.

BACKGROUND OF THE INVENTION

In recent years, using anionic polymerization technique to synthesize star polymers is increasingly stressed, its research scope is continuously enlarged, the said polymer species are growing day after day and a lot of which have embodied industrial production. The field involved was started from the star thermoplastic elastomer coupled star block copolymer of styrene-butadiene ($(SB)_nR$) and coupled star block copolymer of styrene-isoprene ($(SI)_mR$) at the very beginning, and developed now into coupled star random solution polymerized polystyrene-butadiene (S-SBR), low cis polybutadiene (LCBR), medium vinyl polybutadiene (MVBR), and high vinyl polybutadiene (HVBR), even into the latest styrene-isoprene-butadiene rubber (S-SIBR) etc.

There are generally two kinds of processes for anionically synthesizing star polymers. One is using multifunctional organic alkali metal initiator for the synthesis, especially the multifunctional organic lithium initiator; but up to now, the anionic process for synthesizing star polymers is usually a synthesis using a monofunctional alkyllithium as the initiator, firstly synthesizing linear polymer and then adding multifunctional coupling agent for carrying out the coupling reaction to obtain the final product.

Organic lithium initiator is widely used in the anionic polymerization, said organic lithium initiator may be divided into several sorts depending on the number of active centers each molecule contains after being initiated, i.e., monolithium initiator such as RLi; dilithium initiator such as naphthyllithium; and multifunctional organic lithium initiator (wherein the number of active centers each molecule contains is greater than two).

Multifunctional organic lithium initiator is principally used in star polymer synthesis. In comparison with linear high polymers, the star polymers have their own features, for example, in comparison with linear solution polymerized styrene-butadiene rubber, the star solution polymerized styrene-butadiene rubber has better overall mechanical performances after tire-making, mainly a lower rolling resistance, a better wet skid resistance, it is a kind of energy-saving rubber; for further example, in comparison with the linear products, the star medium, vinyl polybutadiene has significantly better processing performance and cold flow resistance; further, with respect to thermoplastic elastomer, the star SBS has, in comparison with linear SBS, higher Mooney viscosity, better tensile strength and higher heat resistance. In addition, the star polymer with particular terminal group has also wide applications in adhesives, liquid rubber etc.

However, this initiator is not much used in practice, because of inaccessibility starting materials, complex manufacture technology, and functionality being neither easily controlled nor regulated, although which can be used in the synthesis of star block copolymer (such as EP 0,210,016, U.S. Pat. No. 4,161,494, U.S. Pat. No. 4,196,153, U.S. Pat. No. 172,190 etc.), and is rarely used in the synthesis of other star polymers. For example, in GB 2124228, the initiator thereof is prepared by the addition of a divinyl aromatic hydrocarbon and an alkyllithium.

The process that RLi is used as the initiator in an aromatic hydrocarbon solvent to initiate a small amount of divinylbenzene (DVB) to prepare multifunctional organic lithium has already been reported in literatures such as GB 2,124, 228; and Helmut Eschwey, Walther Burchard, Polymer, vol. 16, 181, 1975. The functionality of the initiator is controlled by the sorts of RLi (n-BuLi, s-BuLi, t-BuLi), the position of the DVB substituent (p-DVB) and the feed ratio between RLi and DVB.

In the above-stated process, other compounds containing several double-linkages can also be substituted for DVB, such as multivinyl aromatic hydrocarbon compounds: 1,2,4-trivinyl benzene, 1,3,5-trivinylnaphthalene etc.; multivinylphosphor compounds: methyl divinyl phosphor, trivinylphosphor etc.; multivinylsilicon: methyl trivinylsilicon, diethyldivinylsilicon etc., for example, those disclosed in U.S. Pat. No. 4,091,198.

In order that the multifunctional organic alkali metal initiator thus prepared has a higher solubility in non-polar solvent, it was also reported that employing similar processes, e.g. using much larger molecular weight organic compound containing two or three double-linkages to replace DVB to prepare multifunctional organic lithium initiator in an aromatic hydrocarbon or an alkane as well as using RLi as the initial initiator, for example

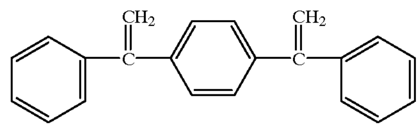

in U.S. Pat. No. 4,196,153; EP 210,016; and

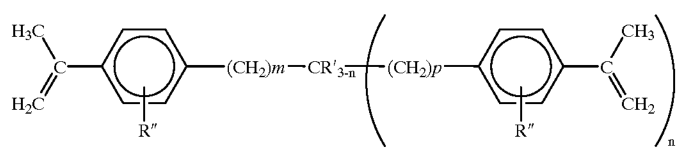

in U.S. Pat. No. 4,161,494; theoretically speaking, the functionality will continuously rise along with the reaction is carried out, but it is generally about 3 as reported.

The multifunctional organic lithium initiator can also be prepared through using RLi to initiate a small amount of a mixture containing a diene and DVB, for example, U.S. Pat. No. 4,091,198.

Further, the multifunctional organic lithium initiator can also be prepared by reacting RLi with the oligomer containing several double-linkages, such oligomer may be polydiene (D. D. U.S. Pat. No. 150,469; D. D. U.S. Pat. No. 158,781), and may also be the "microgelling core" having several double-linkages and formed by the copolymerization of styrene and DVB (Koji Ishizu, Shinichi Gamoo, Takashi Fukutomi, Toshio Kakurai, Polymer J., Vol. 12,399, 1980; Yin Rui-Liu Hao, and Shen Jiacong, The Academic Thesis Photoprint Collection of the National High Molecular Polymer Report Conference, 124, 1987).

On the other hand, the multifunctional organic alkali metal initiator can also be formed by using low molecular weight active polymer to replace RLi to react with DVB etc. (Rempp. P., Iranta. E, Pure Appl. Chem. 30, 229, 1972; Yin Rui, and Shen Jiacong, The Academic Thesis Photoprint Collection of the National High Molecular Polymer Reporting Conference, 126, 1987). The functionality of the initiator is principally influenced by the magnitude of the molecular weight of the active polymers used, the smaller the molecular weight, the higher the functionality, and the scope of the functionality is generally found to be 3~100.

The S-SBR has been put into industrial production by several corporations abroad, they employ basically the second process, such as BP 2,160,207, U.S. Pat. No. 4,397,994, U.S. Pat. No. 4,519,431, U.S. Pat. No. 4,540,749, U.S. Pat. No. 4,603,772, JP 82,205,414 etc.; the coupling agent is generally the metal halide containing several halogen atoms as well as divinyl benzene etc. If dilithium initiator is used, $R_2S_nX_2$ is generally used as a coupling agent so as to avoid gel formation, for example U.S. Pat. No. 4,742,174. In U.S. Pat. No. 4,742,174, there is introduced a solution copolymerization reaction which is carried out by using an organic lithium multifunctional initiator; and then a coupling reaction with the feed including $R_2S_nX_2$ is carried out to prepare a random copolymer of conjugated diene-vinyl substituted aromatic hydrocarbon; from which a composition containing at least 20% of the copolymer can be produced so as to provide a rubber composition useful for improving tire performances.

There exist the following problems to be solved in the art:

(1) the functionality can not be stably controlled nor regulated, for example, in case of RLi+DVB, it is difficult to be used in the industry synthesis of star polymers;

(2) the synthesis of some starting materials themselves is complicated, their purity can not be guaranteed, which can influence the functionality of the final product, such as

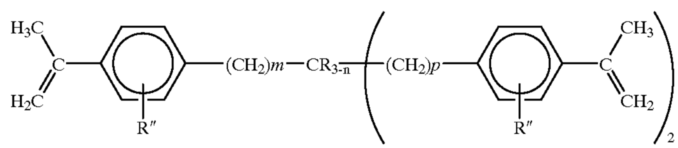

(3) The production cost of RLi is rather high;

(4) There exist no other hetero-atoms in the initiator than carbon, hydrogen, and alkali metal, while with respect to star polymers, in the case that there is contained the hetero-atoms on the macromolecular chain such as the star S-SBR with its macromolecular chain containing the Sn-C linkage, there will appear better carbon black absorption and dispersion for processing the same, which is favorable for improving the strength.

Just because of the above-stated insufficiency of the prior art, the existing star polymer synthesis techniques rarely used multifunctional organic lithium but RLi generally as the initiator, i.e., firstly synthesizing active linear high polymer, then adding thereinto a coupling agent to carry out a coupling reaction, and finally forming the star polymer. These exist many limitations on such synthesis process, i.e., complex technology, low utility rate of the equipments, big investment, acute requirements on the equipments and the polymerization conditions, large energy consumption, low coupling rate, and also unsatisfactory product performances.

In order to find the method for solving the above-indicated problems, the present inventors conducted a deep going research and many tests thereon, so finally there comes into appearance a breakthrough and the present invention is accomplished.

SUMMARY OF THE INVENTION

The present invention relates to an initiator used for anionic polymerization to prepare various kinds of star polymers, the general formula of the initiator is: $M_a\,(RMe)_b$ wherein the element M is selected from the group of Sn, Ti, Al, Si, and/or B; preferably Sn and/or Si; R is a hydrocarbyl containing 8–100 carbon atoms, preferably 20~60; Me is an alkali metal, preferably selected from Na and/or Li, a=0.7~3, preferably 1~3; b=2.5~6.5, preferably 3~5.

The present invention further relates to the process for preparing the above-said initiator, said process comprises the following steps: in the presence of an organic alkali metal initial initiator with a used amount of 0.2~2 mols/100 g monomers, the 1st step is to initiate a reaction of diene and/or mono-olefin monomers in a hydrocarbon solvent to form a hydrocarbyl radical containing an active center at the molecular chain terminal and having 8–100, preferably 20–60 carbon atoms; the 2nd step is to add the compound $MX_j$ or $MR'\,X_{j-1}$, having several radical groups capable of reacting with said active centers to react with the active centers, the used amount of the added $MX_j$ or $MR'\,X_{j-1}$ can result in $$A/B=1.5\sim3,\ \text{preferably}\ A/B=1.5\sim2.5,$$

wherein A is the number of active centers formed in the 1st step, B is the total number of the radical groups capable of reacting with the active centers in the added $MX_j$ or $MR'\,X_{j-1}$, so as to form the multifunctional organic alkali metal initiator $M_a(RMe)_b$, wherein M is selected from the group of Sn, Ti, Al, Si and/or B;

X is selected from F, Cl, and/or Br;

R' is $C_1$–$C_8$ alkyl;

The value of j is equivalent to the valence of element M used; $MX_j$ is in general selected from $SnCl_4$, $T_iCl_4$, $AlCl_3$, $BF_3$, and/or $SiCl_4$, preferably $SnCl_4$ and/or $SiCl_4$;

MR' $X_{j-l}$ is selected from SnR' $Cl_3$ and/or SiR' $Cl_3$, and MR' $X_{j-l}$ is preferably $SnCH_3Cl_3$ and/or $SiCH_3Cl_3$.

The present invention also relates to an anionically polymerized star polymer which is formed by polymerizing monoolefin and/or diene monomer starting materials in an anionic solution polymerization in the presence of an anionic multifunctional organic alkali mateal initiator, said star polymer has a radial molecular structure consisting of several macromolecular chain arms radiating from the initiator core, said chain arm is formed from the used monomers, wherein said initiator is a compound having the general formula $M_a$ $(RMe)_b$, the element M is selected from the group of Sn, Ti, Al, Si and/or B; R is a hydrocarbyl containing 8~100, preferable 20~60 carbon atoms; Me is alkali metal, preferably Na and/or Li; a=0.7~3, preferably 1~3; b=2.5~6.5, preferably 3~5.

The present invention further relates to a process for preparing a star polymer, said process comprises: in the presence of a multifunctional organic alkali metal initiator, polymerizing the monoolefin and/or diene in an anionic solution polymerization in a hydrocarbon solvent, said initiator being the compound having the general formula Ma $(RMe)_b$, wherein element M is selected from the group of Sn, Ti, Al, Si and/or B; R is a hydrocarbyl containing 8~100, preferably 20~60 carbon atoms; Me is alkali metal, preferably Na and/or Li; a=0.7~3, preferably 1~3; b=2.5~6.5, preferably 3~5.

It can be seen herefrom that an object of the present invention is to provide a novel multifunctional organic alkali metal initiator containing other hetero atoms than carbon, hydrogen, and alkali metal, which is used for the synthesis of various star polymers, featuring a lower cost, a simple technology, a lower energy consumption and better product performances.

Another object of the present invention is to provide a process for synthesizing the above-said multi-functional organic alkali metal initiator which results in the features of the synthesis being of a simple technology, and having the functionality capable of being conveniently regulated as desire.

Further object of the present invention is to provide a process for carrying out the anionic polymerization by using said multi-functional organic alkali metal initiator, and to provide the polymerized product resulted from this process.

Other objects of the present invention can be easily represented and understood by referring to the following description.

DETAILED DESCRIPTION ON THE PRESENT INVENTION

Figure 1:
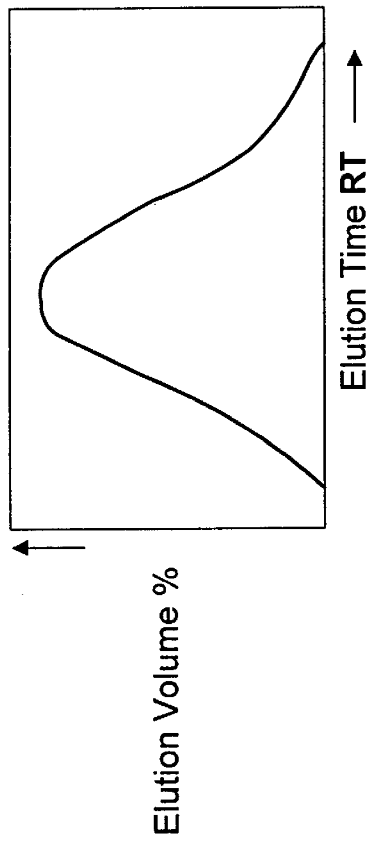
FIG. 1 shows the GPC molecular weight distribution of the star polymer synthesized according to the present invention.

In the anionic polymerization field, the synthesis technology for producing linear polymers is mature, for example, the polymeriztion reaction which is initiated by using naphthalene-sodium, naphthalene-lithium, or alkyllithium etc. as the initiator to polymerize styrene etc. However, the linear polymer products have usually their performances below the requirement of higher performances, and star polymers having better performances ought to be used instead.

The term "star polymer" involved throughout the present specification means the polymer having a radial molecular structure consisting of several macromolecular chain arms radiating from the initiator core in its molecule. The difference between the star polymer and the linear polymer in structure give rise to different features of their own.

For example, linear S-SBR (solution polymerized styrene butadiene rubber) forms free-movable big pendant group in vulcanized rubber because its molecular chain ends and the low molecular materials in said rubber are not easy to be vulcanized, thus the rolling resistance of the tire is increased. By a comparison therein between, the rolling resistance of the star S-SBR is lowered because its molecular chain ends are linked together with the chemical bonds and after vulcanization, the number of the free-movable molecular chain ends in the big molecule network is greatly reduced. On the other hand, because the star S-SBR has a larger content of 1,2-structure, therefore it keeps an excellent wet skid resistance; by a comparison with linear S-SBR, it turns out to be a novel "energy saving rubber".

Meanwhile, the polybutadienes (LCBR, MVBR, HVBR) synthesized by anionic process have their star structure products possessing significantly better processing performances and cold flow resistance than linear products, similarly, they are also "energy-saving rubber" of low rolling resistance and good wet skid resistance. In addition, there are some other properties thereof. For example, star LCBR can, while being used in the synthesis of HIPS, embody an optimum match of high ML and low solution viscosity, the product therefrom is a high gloss HIPS (high impact polystyrene) capable of replacing ABS.

Viewing from the "integral rubber" S-SIBR newly developed in the art, the star structure also has better features than the linear structure.

Viewing from the thermoplastic elastomer SBS and SIS, the star structure has even better Mooney viscosity, tensile strength, and also thermal resistance than the linear structure products.

Furthermore, the star polymers having particular terminal groups have also wide use in the respects of adhesives, liquid rubber etc.

The preparation of star polymers is more complex than that of the linear polymer. One process comprises in firstly synthesizing the linear polymer by using monofunctional alkyllithium as the initiator, and then adding a multifunctional coupling agent to carry out the coupling reaction to obtain the final product; the other process is to use multifunctional organic alkali metal initiator, especially multifunctional organic lithium initiator, to directly initiate the monomers for synthesizing the star polymers. By a comparison, the former process is comparatively more mature, but as most coupling reactions are not easy to be carried out sufficiently, the product is not wholly star polymer in structure, the performances thereof are not sufficiently improved; the production process has a lower efficiency and a larger energy consumption. The latter process has problems such as the initiator starting material being difficult to be obtained, the functionality being not easy to be controlled or regulated thus tending to form gel, and the preparing process being complicated etc., so it is not much used in practice, only a few of them are employed in the synthesis of star block copolymers and very few are used in the synthesis of other star polymers.

In order to solve these problems mentioned above of the two existing anionic polymerization processes, the present inventors have conducted, in said technical field, researches of many years and a great amount of experiments, and finally complete the present invention, creating the initiator of wide use and the synthesis process which needs no coupling step while being capable of controlling and regulating the functionality so as to result in a smooth stable and highly effective synthesis of the star polymers and to manufacture the fully novel star polymer having excellent performances.

Therefore, one aspect according to the present invention is to provide an initiator suitable for being widely used in the anionic polymerization. The initiator the present invention provides to be used for the preparation of various star polymers by anionic polymerization is the compound having the following general formula consisting of hetero atom M and hydrocarbyl alkali metal moiety (RMe):

$$M_a(RMe)_b$$

wherein hetero atom M is the element selected from the group of Sn, Ti, Al, Si and/or B; R is a hydrocarbyl formed by the reaction between monoolefin and/or diene and having 8~100, preferably 20~60 carbon atoms; Me is an alkali metal, preferably sodium and/or lithium; a=0.7~3, preferably 1~3; b=2.5~6.5, preferably 3~5;

According to the present invention, said initiator is synthesized in two steps based on the following reaction scheme:

(1) $[ArH]^-Me^+$+Diene and/or monoolefin monomers solvent→$Me^+C^-$~~~~~~$C^-M^+$ (2) b$Me^+C^-$~~~~~~~$C^-Me^+$+a$MX_j$→$M_a(RMe)_b$ wherein ArH represents fused ring aromatic hydrocarbon such as naphthalene,. anthracene, phenanthrene etc.

Another aspect of the present invention is to provide the two-step synthesis process for said initiator. Said synthesis process comprises: the organic alkali metal is used as the initial initiator with an amount of 0.2~2 mol/100 g monomers, preferably 0.5~1.5 mol/100 g monomers, the 1st step is to initiate diene and/or monoolefin monomers in a hydrocarbon solvent to form the hydrocarbyl having an active center in its molecular chain terminal, the 2nd step is to add the compound $MX_j$ or MR' $X_{j-1}$ having several radical groups (capable of reacting with said active center) to react with the active center, the use amount of the $MX_j$ or MR' $X_{j-1}$ is sufficient to satisfy the ratio A/B=1.5~3, preferably 1.5~2.5, wherein A is the number of the active centers formed in the 1st step reaction; B is the total number of the radical groups capable of being reacted with the active centers in $MX_j$ or MR' $X_{j-1}$, wherein M is selected from the group of Sn, Ti, Al, Si and/or B;

X is selected from F. Cl and/or Br;

the value of j is equivalent to the valence of the element M used;

R' is a $C_1$~$C_8$ alkyl;

The reaction product finally formed is the multifunctional organic alkali metal initiator, $M_a$ $(RMe)_b$.

In the above-stated reaction scheme (1), the organic alkali metal initial initiator $[ArH]^-Me^+$can be either synthesized in situ or using ready-made species; in the present invention, the ready-made species initiator is preferably used, such as naphthalene-lithium, naphthalene-sodium, anthracene-lithium, anthracene-sodium etc., especially preferably naphthalene-lithium and naphthalene-sodium, as the organic alkali metal initial initiator.

In said reaction, the monomers used comprise diene and/or monoolefin wherein diene can be butadiene, isoprene as well as their derivatives; while monoolefin can be vinyl compound monomers such as styrene, α-methylstyrene etc. and acrylates, methacrylates etc. In principle, these monoolefins and dienes have no strict limitation thereon and have a very wide selection scope, said selection is no difficulty for persons skilled in the art. Similarly, the range of the used amount for the monomers is also approximate to those in most anionic polymerizations. In general, the content of the monomers, based on the total weight of the reaction system, is about 110%, preferably about 2~8%.

Controlling of the use amount for the organic alkali metal initial initiator may depend on the molecular weight of the desired hydrocarbyl as well as the desired microstructure of the final polymer. When the used amount of the initiator is large, the molecular weight of the hydrocarbyl formed is small, while of the used amount of the initiator is small, then the molecular weight of the hydrocarbyl formed is high. In the present invention, the used amount of the organic alkali metal initial initiator is that, based on 100 g monomer, the content of alkali metal therein is about 0.2~2 mole, preferably about 0.5~1.5 mole.

The synthesis reaction of said reaction scheme (1) is a typical anionic chemical reaction wherein the solvent used can be the various conventional solvents in such reactions, such as a hydrocarbon solvent etc., including benzene, toluene, cyclohexane, hexane, pentane, heptane, naphtha oil p. 65–110° C. ) etc. They can either be individually used or be used as a mixture solvent of two or several of them. Their use amounts are generally 90–99% by weight of the reaction system, preferably about 92–98%.

Said reaction is in general irreversible; at suitable temperature and pressure, such as 5–50° C. and normal pressure, it can be completed in a very short time such as 15–30 minutes, i.e., in a hydrocarbon solvent, diene and/or monoolefin monomers are initiated to react and form a low molecular weight oligomer having active centers on its molecular chain terminals. As a matter of course, there is no strict limitation on said reaction time duration, it can last for several hours, or even several days and the reaction system is still active; further, there is neither obvious division line between the 1st step reaction and the 2nd one, the two can go on under the same reactin conditions.

The 2nd step reaction is carried out by adding $MX_j$ or MR' $X_{j-1}$ or other hetero atom halide or their alkyl halide into the reaction system obtained in the 1st step reaction. There, M represents Sn, Ti, Al, Si and/or B etc.; X is F, Cl, Br and/or I; while R' is an alkyl having 1–8 carbon atoms, said reactant is a heteroatom-containing compound which contains 3–4 radical groups capable of reacting with the active center, it may be, for example, $SnCl_4$, $TiCl_4$, $AlCl_3$,$BF_3$, $SiCl_4$, $SnBr_4$, preferably $SnCl_4$ and/or $SiCl_4$, as well as SnR' $Cl_3$ and/or SiR' $Cl_3$, preferably $SnCH_3Cl_3$, $SiCH_3Cl_3$, and most preferably $SnCl_4$. The feed thereof can be made for once, and can also be added for several times or continuously in a period of time, it can be fed individually, and can also be fed while mixing with a solvent etc. The reaction time is 0.5~2 hours, there is no strict limitation thereon.

The used amour thereof can be determined proportionally and stoichiometrically according to the values of a, b etc. for the final initiator, i.e., resulting in A/B=1.5~3, wherein A is the number of active centers formed in the 1st step reaction, B is the total number of the radical groups capable of reacting with the active center while being added into $MX_j$ or $MR'X_{j-i}$; in general, the used amount of said hetero atom compound for each 100 g monomers is 0.017~0.44 mole, preferably 0.02~0.44 mole, thereby the controlling requirement a=0.7~3, b=2.5~6.5 can be satisfied. Therefore, we can say, the sorts, the number (value a) of the hetero atom M and the active alkali metal functionality (value b) can be conveniently regulated by means of changing the sorts of reactant M and controlling the ratios between the reactants. In the present invention, said multifunctionality value b is generally controlled to 3~5.

According to one embodiment of the present invention, the preparation according to the present invention is completed under the conditions wherein naphthalene-lithium is used as the organic alkali metal initiator, the monomer is butadiene, the solvent is benzene, the 1st step reaction is carried out for 0.5~2 hours at 5~50° C., subsequently, the hetero atom compound $SnCl_4$ is added and the reaction further continues for 0.5~2 hours at 5~50° C., after the reaction ends, the reaction product is kept under a nitrogen atmosphere for ready. Said reaction product is $Sn_a(R''Li)_b$, wherein a is 1–3, b is 2.5~6.5, R " is a hydrocarbyl having 30–50 carbon atoms.

According to the present invention, the functionality (value b)of the multifunctional organic alkali metal initiator can be regulated by controlling the ratio between the value A of the active center number formed in the 1st step reaction in the reaction system and the value B for the total number of the hetero atom radical groups added in the 2nd step reaction capable of reacting with the active center. For example, in the embodiment in which an organic lithium and $SnCl_4$, are used, the two values have the following corresponding relation (Table 1):

TABLE 1

| A/B (mole ratio) | 2.4 | 2.2 | 2 | 1.8 | 1.6 |
|---|---|---|---|---|---|
| Average functionality f | 2.8 | 3.3 | 3.8 | 4.1 | 4.4 |

In the calculation method for the active alkali metal functionality of the initiator according to the present invention, the membrane osmometry is used to determine the molecular weight of the synthesized multifunctional organic alkali metal initiator, and this calculation is made based on the following formula:

$$\text{Functionality (value } b) = \frac{[Me]}{W/Mn\ \text{(found)}}$$

wherein [Me] is the total number of the residue of the active alkali metal in the system after the reaction ends, W is the monomer feed, Mn (found) is the number average molecular weight of the initiator measured.

Another aspect of the present invention is to provide the star polymer prepared by using the above-stated multifunctional organic alkali metal initiator of the present invention to initiate diene and/or monoolefin in an anionic solution polymerization, said star polymer has a radial molecular structure consisting of several macromolecular chain arms radiating from the initiator core, said chain arm is formed from the used monomers, wherein said initiator is the multifunctional organic alkali metal initiator having the general formula $M_a(RMe)_b$ in which element M is selected from the group of Sn, Ti, Al, Si and/or B; R is a hydrocarbyl having 8~100 carbon atoms, preferable 20~60 carbon atoms; Me is an alkali metal, preferably Na and/or Li; a=0.7~3, preferably 1~3; b=2.5~6.5, preferably 3~5; said monomer is diene and/or monoolefin.

The monomer used in the anionic polymerization reaction conducted according to the present invention may be diene such as butadiene, isoprene, pentadiene as well as their homologues etc.; it may also be monoolefin such as vinyl aromatic hydrocarbon including styrene, α-methylstyrene as well as their homologues etc. When the copolymerization reaction is carried out to produce copolymers, the ratios between the various monomers all can be arbitrarily regulated, for example, arbitrarily varying in the range of 0.1–99.9% by weight of the reaction monomer, especially in the range of 10%–90% commonly used for regulating. Therefore, the star polymer of the present invention can essentially be the synthesized product of any monomers capable of being anionically polymerized, various products having different performances can be synthesized in different time duration and by changing different monomers in the synthesizing reaction, thereby the molecular design can be realized and the synthesis control means for changing performances of the final product as desired can also be obtained.

More importantly, because of using the multifunctional alkali metal initiator of the present invention, the synthesis of the star polymer can be directly accomplished by means of anionic polymerization reaction, it is unnecessary to have the subsequent coupling step as does in the prior art. One of the important distinguishing features of the polymerized products produced by this one-step synthesis process lies in that the molecular weight distribution for said polymerized product expressed by GPC presents a uniform single peak distribution as shown in FIG. 1. However, the GPC charts corresponding to the molecular weight distributions for various kinds of coupled star polymers all fail to show such a uniform single peak as presently the star polymer of the present invention, but multimodal distribution which turns out to be an important sign for the extremely large difference of the molecular weights resulted from the subsequent coupling step. As shown in FIGS. 2–6, they are respectively the GPC charts of molecular weight distributions for S-1215 (SHELL), SL-552 (JSR), 1204 (Asahi Chemical Industry CO., LTD) and NS-110 and NS-114 (Nippon Zeon LTD.), all of them present very obvious multimodal. As a matter of course, subsequent treatments such as two-or more-batches blending etc. can also bring forth multimodal distribution of the polymer products of the present invention, but the molecular weight distribution for the directly polymerized product of the present invention will only give rise to such single peak as shown by GPC.

From the above description, it can be found that using the initiator of the present invention, a great variety of polymerization products of different performances can, by means of the anionic polymerization technology, be produced from different monomers used in different prescription ratios of the various monomers, they can be star homopolymers such as LCBR, MVBR, HVBR, etc. or can be star copolymers such as $(SB)_nR$, $(SI)_nR$, S-SBR, HIPS, as well as star polymers having partially polar monomer (such as MMA) segments, or can even be a series of various known or unknown star polymer products being developed such as the internationally newly developed "integral rubber" (S-SIBR) etc.

For the star polymers synthesized according to the present invention, there exist 2.5–6.5 macromolecular chain arms in each polymer molecule on an average, which can be regulated by the functionality of the initiator. Further, as the multi-functional organic alkali metal initiator itself contains hetero atoms such as Sn, Ti, Al, Si and B, so the corresponding star polymer also contains same hetero atoms.

While with respect to rubber-se star polymers (such as LCBR, MVBR, HVBR, S-SBR, S-SIBR etc.), the introduction thereinto of the hetero atoms is favorable for the homogeneous distribution of carbon black therein, thus the overall mechanical properties of the products can be improved. Such improvement is, to the polymers synthesized using the initiating system containing no hetero atom, is not easy to reach. Such improvement of the product performances and simplification of production technology give rise to excellent economic benefit and industrial applicability.

Another important aspect of the present invention is the process for preparing star polymers in the presence of the multifunctional organic alkali metal initiator of the present invention. Said process comprises: in the presence of a multifunctional organic alkali metal initiator, a monoolefin and/or a diene are polymerized in an anionic solution polymerization in a hydrocarbon solvent. Said initiator is a compound having the general formula $M_a\ (RMe)_b$, wherein the hetero atom M is selected from the group of Sn, Ti, Al, Si, and/or B; R is a hydrocarbon formed by a reaction of monoolefin and/or diene and having 8~100, preferably 20~60 carbon atoms; Me is an alkali metal, preferably sodium and/or lithium; a=0.7~3, preferably 1~3; b=2.5~6.5, preferably 3~5.

In the process of the present invention for the preparation of star polymers, said multifunctional organic alkali metal initiator was, in the polymerizing reaction system, used in an amount range of about 0.5~10 millimoles, (preferably about 0.7~6 millimoles)/100 g monomer based on the active alkali metal millimoles.

The reaction temperature is between 5 and 100° C., preferably 10~90° C. The reaction pressure is generally from normal pressure to 0.5 MPa. The reaction time is not strictly restricted, generally between 0.5 hour and 8 hours. Finally, according to the conventional technique, a small amount of an alcohol is added therein to deactivate the active centers and the reaction is terminated.

As indicated above, the monomers selected can be any monomers capable of being used for anionic polymerization, they can be a diene such as butadiene,. isoprene, pentadiene, as well as their homologues etc., they can also be monoolefin such as vinyl aromatic hydrocarbon—styrene, α-methylstyrene, as well as their homologues etc.; acrylic monomers such as acrylates, methacrylates etc. all can be used as the monomers for the polymerization process of the present invention. Further more, when the copolymerization reaction is conducted to produce copolymer products, the ratios of various monomers all can be regulated, for example, the total weight of the reaction monomers can vary arbitrarily in the range of 0.1%–99.9%, preferably 10%–90% which is the more commonly used regulating range. The selection of said monomers is very easy for persons skilled in the art. Similarly, the used amount range of the monomers also approximates to that in most anionic polymerization, i.e., based on the total weight of the reaction system, the monomer content is about 5~20%, preferably 8~15%.

In the process of the present invention, the solvent used may be any solvent or mixed solvent capable of being used in the anionic polymerization field. Generally, a hydrocarbon solvent is used as the solvent of the polymerization process of the present invention, such as cyclohexane, pentane, haxene, heptane, naphtha oil(b.p. 65–110° C.), benzene, toluene etc. or mixed solvents thereof. The amount range of said solvent are generally about 80%–95% by weight preferably about 85%–92%, based on the total weight of the reaction system.

In said polymerization process, other auxilliary agents can be used in order to satisfy the reguirements of the final product, for example, a Lewis base regulator, such as diglyme (2G), triglyme (3G), dimethoxy-ethane (DME), hexamethylphosphortiamide (HMPTA), tetramethylethylenediamine (TMEDA), tetrahydrofuran (THF), dioxane (DOX), triethylamine and other ether or amine compounds. Their use amounts are well known for persons skilled in the art, it is very easy to determine them based on different requirements and unnecessary to give further limitations thereon.

In an embodiment of the present invention, said anionic polymerization is carried out as follows. Before the reactants are added thereinto, the reactor is baked at high temperature and is purged with nitrogen gas for 3 times or more, then the monomer solution and, optionally, the metered Lewis base regulator is added thereinto, finally the multifunctional organic alkali metal initiator is added by metering. The reaction is conducted for 2–5 hours at 40–90° C. and normal pressure under the protection of nitrogen atmosphere. Then, the reaction is terminated by adding methanol thereinto, and the solvent is evapourated out under the treatment of water steam. After dehydration and drying, the star polymer is actually obtained.

Because the present invention uses the newly developed anionic polymerization multifunctional organic alkali metal initiator, the synthesis technology does not need additional coupling reaction, and simplifies the production flow, thus the equipments are simpler and the energy consumption is lowered; meanwhile, the above-stated initiator of the present invention can be suitable for the synthesis reaction of many different monomers, can make a change for producing various products at any time without extra equipment investment, there is much maneuverability and flexibility therein; further, as there is not coupling step, so the performances of the polymerization products are improved, said coupling reaction takes place between the macromolecular chain and the small molecule coupling agent, the steric hindrance effect resulted from large viscosity of the macromolecule system and molecular chain winding thereof will both influence the coupling effect (generally about 50%). The present invention needs no coupling step, the star polymers can be achieved by one-step polymerization and the molecular weight distribution thereof is comparatively uniform and there exist essentially no linear macromolecules. Hence, both their mechanical properties and dynamic mechanical properties are improved over all as a whole, same conclusion can be achieved from the performance comparisons conducted in the following examples.

Now, the present invention is specifically described with reference to Examples. However, it should be understood that the present invention by no means restricted by such examples. Related properties tests involved therein and their measuring methods include: "300% tensile strength", "tensile strength at break" and "elongation at break" (according to the Chinese Measuring Standard GB 528); "Shore A hardness" (measured according to GB 531–83) and Tg (determined on a dynamic visco-elastometer).

EXAMPLE 1

30 ml benzene, 1.2 g butadiene, and 12 ml initial initiator naphthyllithium were added into a cleaned 100 ml polymerizing flask stirred electro-magnetically, the reaction was conducted for 1 hour at 20° C. Then, 1.44 millimole tin tetrachloride was added thereinto and the reaction continued for an additional hour at 20° C. and then was terminated. The product multifunctional organic lithium initiator was obtained, its functionality was 3.8 on an average. Each molecule contained 1 tin atom on an average.

EXAMPLE 2

The experimental apparatus was same as that in example 1.30 ml naphtha oil(b. p. 65–110° C. ), 1.8 g isoprene, 3.5 millimoles initial initiator naphthalene-lithium were added thereinto, the reaction was conducted for 1 hour at 20° C. Then, 0.6 millimole tin tetrachloride was added thereinto, the reaction was continued for an additional hour at 20° C. and then was terminated. The functionality of the product was 6.5 on an average. Each molecule contained 2.6 tin atoms on an average.

EXAMPLE 3

The experimental apparatus was same as that in example 1.30 ml cyclohexane, 1.8 g isoprene, and 8 millimoles initial initiator naphthalene-sodium were added thereinto, the reaction was conducted for 1 hour at 25° C. Then 0.9 millimole silicon tetrachloride solution was added thereinto, the reaction continued for an additional hour at 25° C. and then was terminated. The multifunctional organic sodium initiator obtained had an average functionality of 2.5. Each molecule contained 0.7 silicon atoms on an average.

EXAMPLE 4

Experimental apparatus was same as that of example 1.30 ml cyclohexane, 2.4 g styrene, and 12 millimole initial initiator naphthalene-lithium were added thereinto, the reaction was conducted for 1 hour at 25° C. Then 2 millimoles of $SiCH_3Cl_3$ are added thereinto, the reaction continued for 1 hour and then was terminated. The multifunctional organic lithium initiator obtained had an average functionality of 2.9. Each molecule contained 1 silicon atom on an average.

EXAMPLE 5

4,000 ml cyclohexane, 400 g butadiene, 100 g styrene, 25 ml tetrahydrofuran, and 240 ml multifunctional organic lithium initiator synthesized in example 1 were added into a cleaned 10 liters stainless steel vessel, and a typical anionic polymerization reaction was carried out at 50° C. for 4 hours. Then 10 ml methanol containing 0.7 g 2,6-di-tert-butyl-4-methyl phenol was added thereinto so as to terminated the reaction. The solvent was stripped by deionized water at 90° C. The product is dried to a constant weight. The total weight of the product is 500 grams.

The polymer obtained is star random copolymer of butadiene-styrene with 45% of 1,2-structure, 3.8 arms on an average and a number average molecular weight of 302,000, and the ratio Mw/Mn=1.81.

EXAMPLES 6–8

1,140 ml cyclohexane, 112 g butadiene, 28 g styrene, and 6.6 ml tetrahydrofuran were added into a cleaned 2 liters stainless steel vessel after being purged with nitrogen gas in triplicate, and then added into each of them respectively 2 ml one of the three different multifunctional organic lithium initiator (their average functionalities are shown in Table 2). After a reaction at 50° C. and under normal pressure for 2 hours, 10 ml methanol solution containing 1 g 2,6-di-tert-butyl-4-methyl phenol was added so as to terminated the reaction. The product was put into the deionized water at 90° C. to evapourate out the solvent and dried. Then, the star S-SBR was obtained. The total weight of the product was 140 g.

TABLE 2

| Examples 6–8 | | | |
|---|---|---|---|
| Example | 6 | 7 | 8 |
| Functionality of Multifunctional Organic Lithium | 2.8 | 3.4 | 4.1 |
| Average Number of Polymer Arms | 2.8 | 3.3 | 4.0 |
| Mn | 229,000 | 267,000 | 325,000 |
| Mw/Mn | 6.8 | 2.2 | 1.3 |
| 1, 2-Structure % | 45 | 45 | 45 |
| Tensile Strength at Break (MPa) | 21.4 | 22.9 | 23.2 |
| 300% Tensile Strength (MPa) | 12.0 | 11.7 | 13.0 |
| Elongation at Break (%) | 480 | 530 | 520 |
| tg δ | | | |
| 0° C. | 0.179 | 0.216 | 0.210 |
| 50° C. | 0.103 | 0.106 | 0.124 |

EXAMPLE 9

Into the cleaned 2 liters stainless steel vessel after being purged with nitrogen gas, 1140 ml cyclohexane, 53 g butadiene, 53 g isoprene, 35 g styrene, 2 ml tetrahydrofuran, and 12 ml multifunctional organic lithium initiator prepared in Example 1 (average functionality of 3.8) were added. The reaction was conducted for 4 hours at 50° C. and under normal pressure. The post-trearment of the product was same as that of example 5.

The product obtained was 130 g star S-SIBR. The molecular weight was 290,000, the molecular weight distribution was 1.46, the average arm number was 3.8. Its performances are shown in Table 3.

TABLE 3

| Mechanical Performances | |
|---|---|
| Tensile Strength (MPa) | 19.0 |
| 300% Tensile Strength (MPa) | 12.0 |
| Elongation at Break (%) | 400 |
| Hardness (Shore, A) | 60 |
| Resilience (%) | 26 |

EXAMPLE 10

Into the cleaned 2 liters stainless steel vessel after being purged with nitrogen gas, 1140 ml cyclohexane, 80 g butadiene, 16 ml multifunctional organic lithium prepared in example 1 were added to be polymerized for 2 hours at 80° C. and under normal pressure. Then 43 g styrene was added thereinto, the reaction continued for additional 2 hours, and then methanol was added to terminate the reaction. The post-treatment of the product was same as that of example 5. The product obtained was star block copolymer (SB)nR. The total weight of the product obtained was 123 g. Its molecular weight was 170,000. Its 1,2-structure content was 19%. Its molecular weight distribution was 1.17. Its average arm number was 3.8.

EXAMPLE 11

Into the cleaned 2 liters stainless steel vessel after being purged with nitrogen gas, 1100 ml cyclohexane, 100 g isoprene, 16 ml multifunctional organic lithium prepared in example 1 (average functionality of 3.8) were added to polymerize for 2 hours at 50° C. and under normal pressure. Then, 18 g styrene was added thereinto, the reaction continued for additional 2 hours, and then methanol was added to terminate the reaction. The post-treatment of the product was same as that of example 1. The product obtained was star block copolymer (SI),R. The total weight of the product obtained was 118 g. Its molecular weight was 160,000. Its 3,4-structure content was 25%. Its molecular weight distribution was 1.36. Its average arm number was 3.7.

EXAMPLE 12

Into the cleaned 2 liters stainless steel vessel after being purged with nitrogen. gas, 920 ml cyclohexane, 110 g butadiene, 12 ml multifunctional organic lithium initiator prepared in example 1 (average functionality of 3.8) were added. The reaction was carried out for 2 hours at 80° C. and normal pressure. The post-treatment of the product was same as that of example 5. The product obtained was star polybutadiene. The total weight of the product obtained was 110 g. Its 1,2-structure content was 16%. Its cis-1,4-structure content was 35%. Its trans-1,4-structure content was 49%. Its molecular weight was 270,000. Its molecular weight distribution was 1.4. Its average arm number was 3.8.

EXAMPLES 13–15

Into the cleaned 2 liters stainless steel vessel, 920 ml naphtha oil (b.p. 65–110° C.), 100 g butadiene, a Lewis base and 12 ml multifunctional organic lithium initiator prepared in example 1 (average functionality of 3.8) were added. The sorts and the amounts of the Lewis base was shown in Table 4. The reaction was conducted for 2 hours under normal pressure at temperature as listed in Table 4, and then was terminated. The post-treatment of the product was same as that of example 1. The product obtained was a star polybutadiene.

TABLE 4

| Example | 13 | 14 | 15 |
|---|---|---|---|
| Lewis Base | THF | TMEDA | 2G |
| Amount of Lewis Base (ml) | 2 | 0.1 | 0.2 |
| Reaction Temperature ° C. | 50 | 60 | 40 |
| 1, 2-Structure Content (%) | 42 | 60 | 81 |

EXAMPLE 16

As an example for performances of the star polymer in comparison with the prior art, the present example selected the Sn-SBR star polymer of the present invention prepared in example 5 above to conduct a comparison with commercial available products: SL-577® (JSR), S-SBR (Japan F. T.) as well as linear S-SBR and E-SBR-1500.

The experimental results were listed in the Table 5 below weherein the tg δ at 0° C. represented wet skid resistance, the higher the value, the better the wet skid resistance. The tg 6 at 50° C. presented rolling resistance, the lower the value, the lower the rolling resistance. With respect to the comparison of molecular weight distribution, the star polymer of the present invention had a wider distribution in comparison with the narrow distribution of the linear polymer (anionic polymerization), showing that the cold flow property as well as the processing performance of the present invention turns out to be much better.

Table 5. Mechanical Dynamic Performances of Several SBRs

TABLE 5

Mechanical Dynamic Performances of Several SBRs

| | SL-557 | S-SBR | Sn-SBR (Example 6) | S-SBR (Linear) | E-SBR |
|---|---|---|---|---|---|
| 300% Tensile Strength (MPa) | 16.8 | — | 14.6 | 12.5 | 10.6 |
| Tensile Strength (MPa) | 23.4 | 23.5 | 23.6 | 23.3 | 25.0 |
| Elongation at Break (%) | 500 | 400 | 460 | 540 | 600 |
| Permanent Set (%) | 10 | — | 10 | 16 | 12 |
| Hardness (Shore A) | 70 | — | 66 | 67 | 63 |
| tg δ | | | | | |
| 0° C. | 0.28 | 0.24 | 0.17 | 0.154 | 0.167 |
| 50° C. | 0.12 | 0.126 | 0.09 | 0.139 | 0.149 |

The present example further conducts the molecular weight distribution measurement on the Sn-SBR star polymer product prepared in example 6. Membrane osmometry was used to measure the molecular weight. The GPC is used to measure the molecular weight distribution (Tetrahydrofuran is the solvent, 10 mg/10 ml).

The final results expressed by GPC was shown in the attached FIG. 1.

Figure 2:
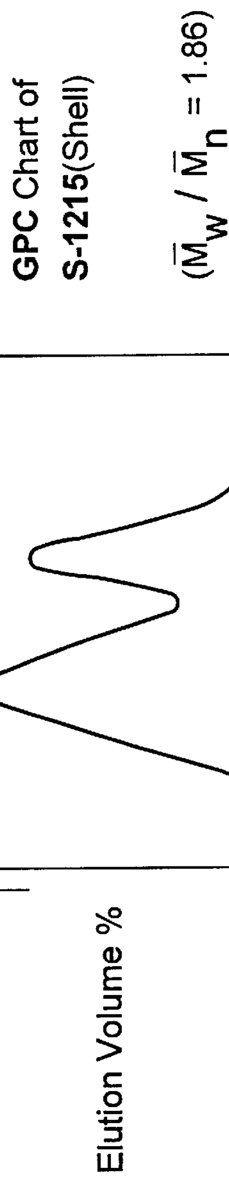
FIG. 2–FIG. 6 show respectively the GPC chart for the molecular weight distribution of the coupled S-SBR produced respectively by SHELL, JSR (Japan Synthetic Rubber Co., Ltd), Asahi Chemical Industry Co., Ltd., and Nippon Zeon, LTD.
Figure 3:
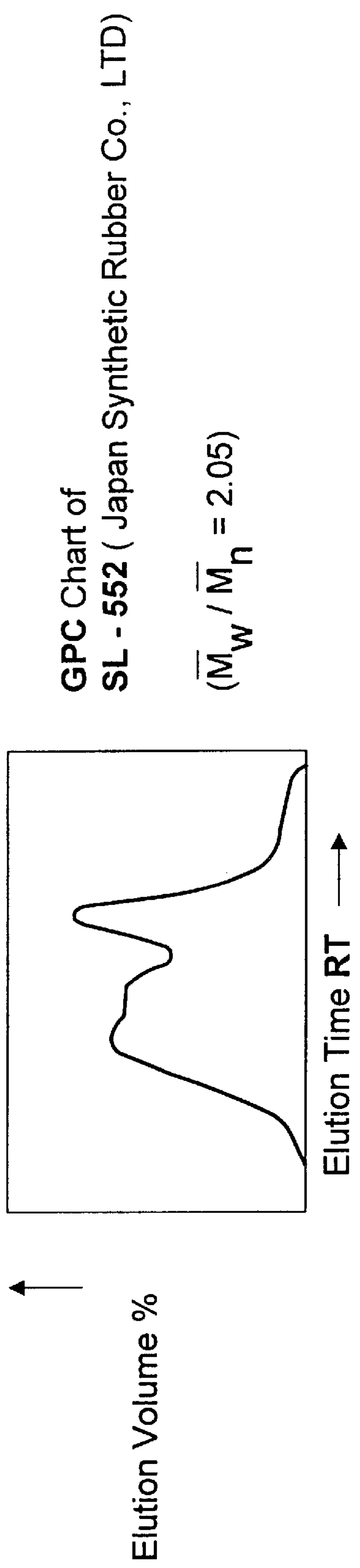
Figure 4:
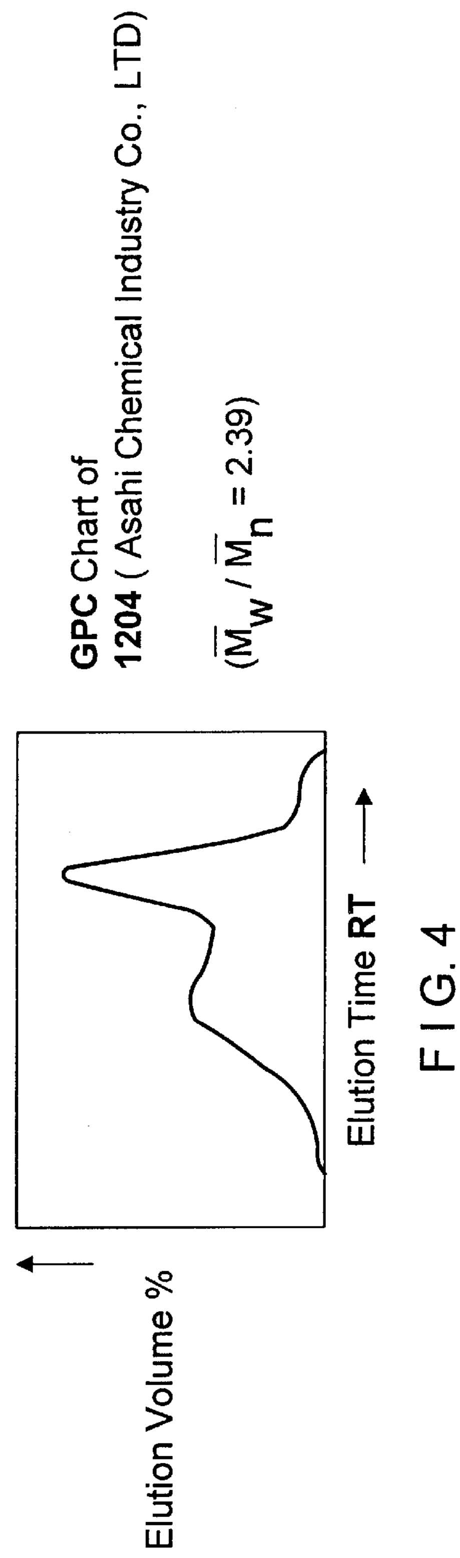
Figure 5:
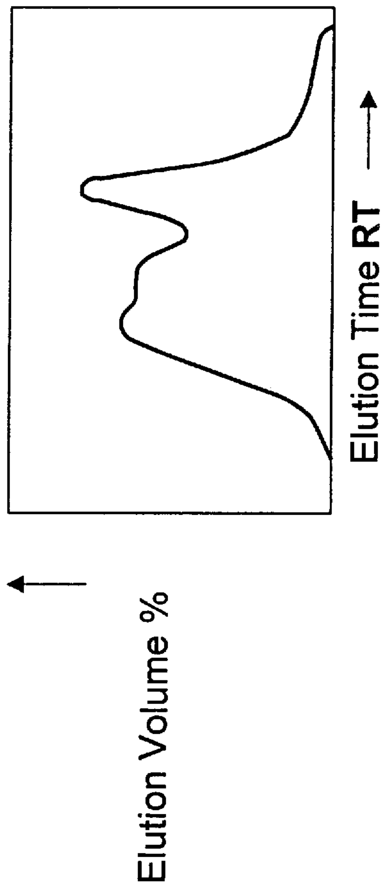
Figure 6:
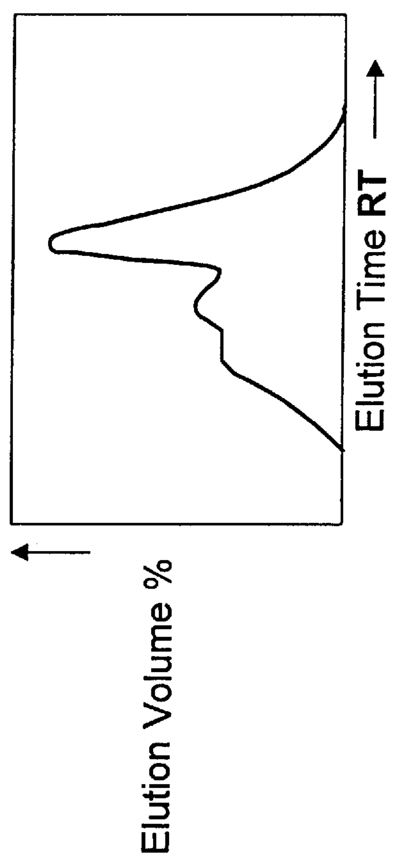

Meanwhile, the following commercial available products were selected to be used in the comparitive experiments:

① S-1215$^R$ (SHELL)-a coupling S-SBR, the GPC chart is shown in the attached FIG. 2, ② SL-552$^R$ (JSR)-a coupling S-SBR, the GPC chart is shown in the attached FIG. 3, ③ 1204$^R$ (Asahi Chemical Industry Co., LTD)-a coupling S-SBR, the GPC chart is shown in the attached FIG. 4, ④ NS-110$^R$ and NS-114 (Nippon Zeon, LTD)—the couping S-SBR, the GPC charts are shown in the attached FIGS. 5 and 6.

Industry Applicability

In comparison with the prior art, the process for synthesizing the multifunctional organic alkali metal initiator of the present invention, because the starting materials are easily avaiable and are of lower price, the synthesis technology is simple, the regulation of the functionality is more convenient, possesses better industry applicability. The initiator of the present invention can be applied to star polymer synthesis, for example, star random copolymer of styrene-butadiene (energy-saving solution polymerized styrene-butadiene rubber), star random copolymer of styrene-isoprene, star random terpolymer of styrene-butadiene-isoprene, star medium vinyl-,high vinyl-poly-butadiene, star medium cis-polyisoprene or 3,4-and 1,2-polyisoprene, star $(SI)_NR$ or (SB)NR (thermoplastic elastomer), K-resin, and star polymer having particular terminal groups (functional elastomer) which can be —OH, —COOH, —X, —$NR_2$ (R:H or alkyl) etc. In comparison with the traditional technology (firstly polymerization and then coupling), the process by using the multifunctional organic alkali metal of the present invention to synthesize the above-stated various kinds of polymers possesses significant advantages such as a lower production cost, fewer equipment demands, simpler production flow etc.

What is claimed is:

1. An initiator for preparing star polymers in an anionic polymerization, said initiator having the formula:

$M_a(kMe)_b$ wherein M is an element selected from the group consisting of Sn, Ti, Al, Si, and B; R is a hydrocarbyl radical group having 8 to 100 carbon atoms; Me is an alkali metal; a=0.7 to 3 and b=2.5 to 6.5.

2. An initiator according to claim 1, wherein said hydrocarbyl radical group is a polymerized group having 20 to 60 carbon atoms of mono-olefin and/or diene monomers.

3. An initiator according to claim 1, wherein in the formula a=1 to 3 and b=3 to 5.

4. An initiator according to claim 1, wherein said alkali metal is Na and/or lithium.

5. An initiator according to claim 1, wherein said element M is Sn and/or Si.

6. A process for preparing the initiator of claim 1 comprising the following steps:

(a) admixing, in a hydrocarbon solvent, diene and/or mono-olefin monomers and an organic alkali metal precursor initiator, with the precursor initiator being present in the solvent in an amount of 0.2 to 2 moles/100 g of the monomers, to initiate a reaction that results information of a reaction product comprising a plurality of hydrocarbyl radical groups each having 8 to 100 carbon atoms and a molecular claim terminal containing an active center;

(b) adding to the reaction product a compound selected from the group consisting of $MX_j$, $MR'X_{j-1}$ and a mixture thereof, said compound having a plurality of radical groups for reacting with the respective active centers of the hydrocarbyl radical groups to form the initiator $M_a(RMe)_b$, wherein M, Me, R, a and b are as defined in claim 1, X is a halogen selected from the group consisting of F, Cl and Br, R' is a $C_1$–$C_8$ alkyl and j has a value that is equivalent to the valence of element M, said compound being added to the reaction product in an amount such that the radical groups of the compound react with the active centers of the reaction product in a ratio $A/B=1.5 \text{ to } 3$ wherein A is the number of active centers in the reaction product and B is the number of radical groups in the compound.

7. A process according to claim 6, wherein $MX_j$ is selected from the group consisting of $SnCl_4$, $TiCl_4$, $AlCl_3$, $BF_3$, $SiCl_4$ and mixtures thereof, and MR' $X_{j-1}$ is selected from the group consisting of $SnCH_3Cl_3$, $SiCH_3Cl_3$ and mixtures thereof.

8. A process according to claim 6, wherein the amount of the precursor initiator in the solvent is 0.3 to 1.5 mol/100 g monomer and A/B is 1.5 to 2.5.

9. A process according to claim 6 wherein the initiator in the solvent comprises an organic alkali metal that is a reaction product of a fused ring aromatic hydrocarbon and an alkali metal, said fused ring aromatic hydrocarbon being selected from the group consisting of naphthalene, anthracene, and phenanthrene, and said alkali metal being Na and/or Li.

10. A process according to claim 6, wherein the initiator comprises an organic alkali metal that is naphthalene lithium.

11. A process according to claim 6, wherein said diene monomers comprise a diene selected from the group consisting of butadiene, isoprene and homologues thereof, and said monoolefin monomers comprise a monoolefin selected from the group consisting of styrene, α-methyl styrene and homologues thereof.

12. A process according to claim 6, wherein said hydrocarbon solvent is selected from the group consisting of benzene, toluene, cyclohexane, pentane, hexane, heptane, naphtha oil (b.p. 65–110° C.), and mixtures thereof.

13. A process according to claim 6, wherein for each 100 g of diene and/or monoolefin monomers, the compound is added in an amount of 0.017 to 0.44 mole.

14. A process according to claim 6, comprising cleaning a reactor for carrying out an anionic reaction, feeding benzene, butadiene and a naphthalene lithium precursor initiator into the reactor and carrying out the reaction step (a) for 0.5–2 hours at 5–50° C. to form the reaction product; adding $SnCl_4$ solution to the reaction product so as to cause the reacting of step (b) to continue for 0.5–2 hours at 5–50° C. to form $Sn_a$ $(R''Li)_b$, wherein a is 1 to 3, b is 2.5 to 6.5, and R'' is a hydrocarbyl group having 30 to 50 carbon atoms.

15. A polymerized product prepared by carrying out an anionic solution polymerization reaction of monoolefin or diene monomers and, optionally, acrylic monomers in the presence of a multifunctional organic alkali metal initiator so that the polymerized product consists essentially of a plurality of star polymers each having a radial molecular structure consisting of a plurality of macromolecular chain arms formed from the reaction and radiating from an initiator core, wherein said initiator is a multifunctional organic alkali metal initiator having the formula $M_a(RMe)_b$, M is an element selected from the group consisting of Sn, Ti, Al, Si and B, R, is a hydrocarbyl group having 8 to 100 carbon atoms; Me is an alkali metal; a is 0.7 to 3, and b is 2.5 to 6.5.

16. A polymerized product according to claim 15, comprising a molecular weight distribution of uniform single peak distribution as measured by gel permeation chromatography, and said monomers are diene and/or monoolefin monomers.

17. A polymerized product according to claim 15, wherein said monomers are selected from the group consisting of (a) butadiene, isoprene, pentadiene, and homologues thereof, (b) styrene, a-methylstyrene and homologues thereof; and (c) acrylates, methacrylates and mixtures thereof.

18. A polymerized product according to claim 15, wherein each of the star polymers is a homopolymer of a monomer selected from the group consisting of (a) butadiene isoprene, pentadiene, and homologues thereof, (b) styrene, α-methylstyrene and homologues thereof; and (c) acrylates and methacrylates.

19. A polymerized product according to claim 15, wherein each of the star polymers is a copolymer of two or more monomers selected from the group consisting of (a) butadiene, isoprene, pentadiene and their homologues, (b) styrene, a-methylstyrene and their homologues, and (c) acrylates and methacrylates.

20. A process for preparing a star polymer comprising:

(a) providing a multifunctional organic alkali metal initiator having the formula $M_a(RMe)b$ wherein M is an element selected from the group consisting of Sn, Ti, Al, Si and B, R is a hydrocarbyl group having 8 to 100 carbon atoms; Me is an alkali metal; a=0.7 to 3 and b=2.5 to 6.5; and (b) carrying out an anionic polymerization reaction between monoolefin and/or diene monomers and, optionally, acrylic monomers in the presence of said initiator in a hydrocarbon solvent.

21. A process according to claim 20, wherein each of said star polymers comprises a hydrocarbyl group that is a polymerized product having 20 to 60 carbon atoms of monoolefin and/or diene monomers, and optionally acrylic monomers; said monomers being selected from the group consisting of (a) butadiene, isoprene, pentadiene, and their homologues, (b) styrene, α-methystyrene, and their homologues, and (c) acrylates, methacrylates, and mixtures thereof.

22. A process according to claim 20, wherein said alkali metal is Na and/or Li.

23. A process according to claim 20, wherein said element M is selected from the group consisting of Sn and Si.

24. A process according to claim 20, wherein said monomers are selected from the group consisting of (a) butadiene, isoprene, pentadiene and their homologues, (b) styrene, α-methylstyrene and their homologues, and (c) acrylates, methacrylates and mixtures thereof.

25. A process according to claim 20, wherein said hydrocarbon solvent is selected from the group consisting of benzene, toluene, cyclohexane, pentane, hexane, heptane, naphtha oil (b.p. 65–110° C.), and mixtures thereof.

26. A process according to claim 20, wherein said initiator is present in the solvent in step (b) in an amount of between 0.5 to 10 millimoles/100 g monomer based on an amount of active alkali metal millimoles present in said initiator.

27. A process according to claim 20, wherein the monomers in the solvent in step (b) are present in an amount of 5 to 20% by weight.

28. A process according to claim 20, comprising adding a Lewis base regulator into said anionic solution polymerization, said regulator being selected from the group consisting of diglyme, triglyme, dimethoxyethane, hexamethyl phosphoric triamide, tetramethylethylene diamine, tetrahydrofuran, dioxane and triethylamine.

29. A polymerized product according to claim 15, wherein in the formula of the multifunctional organic alkali metal initiator a=1 to 3 and b=3 to 5.

30. A polymerized product according to claim 15, wherein the star polymers have an average number of macromolecular chain arms of 2.5–6.5 and the polymerized product has a molecular weight distribution that is substantially uniform and is substantially free of linear macromolecules.

* * * * *

UNITED STATES PATENT AND TRADEMARK OFFICE

CERTIFICATE OF CORRECTION

PATENT NO. : 6,150,487
DATED : November 21, 2000
INVENTOR(S) : Xingying Zhang, et al.

It is certified that error appears in the above-identified patent and that said Letters Patent is hereby corrected as shown below:

Title page,
Item 86 "Jun. 26" should read -- Jun. 24 -- and "Jun. 29" should read -- Jun. 24 --.

Signed and Sealed this

Twenty fifth Day of September, 2001

Attest:

*Nicholas P. Godici*

NICHOLAS P. GODICI

*Attesting Officer* *Acting Director of the United States Patent and Trademark Office*